United States Patent
Seshadrinathan et al.

(10) Patent No.: US 10,165,257 B2
(45) Date of Patent: Dec. 25, 2018

(54) ROBUST DISPARITY ESTIMATION IN THE PRESENCE OF SIGNIFICANT INTENSITY VARIATIONS FOR CAMERA ARRAYS

(71) Applicant: Intel Corporation, Santa Clara, CA (US)

(72) Inventors: Kalpana Seshadrinathan, Santa Clara, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 15/278,615

(22) Filed: Sep. 28, 2016

(65) Prior Publication Data

US 2018/0091799 A1     Mar. 29, 2018

(51) Int. Cl.
| | |
|---|---|
| G06K 9/00 | (2006.01) |
| H04N 13/271 | (2018.01) |
| G06K 9/62 | (2006.01) |
| H04N 13/133 | (2018.01) |
| H04N 13/15 | (2018.01) |
| H04N 13/243 | (2018.01) |
| H04N 13/00 | (2018.01) |

(52) U.S. Cl.
CPC ......... *H04N 13/271* (2018.05); *G06K 9/6212* (2013.01); *H04N 13/133* (2018.05); *H04N 13/15* (2018.05); *H04N 13/243* (2018.05); *H04N 2013/0081* (2013.01)

(58) Field of Classification Search
USPC ....................................................... 382/154
See application file for complete search history.

(56) References Cited

U.S. PATENT DOCUMENTS

| | | |
|---|---|---|
| 8,995,719 B2 | 3/2015 | Ma et al. |
| 2010/0302383 A1 | 12/2010 | Fuh et al. |
| 2011/0025825 A1 | 2/2011 | McNamer et al. |
| 2011/0176722 A1 | 7/2011 | Sizintsev et al. |
| 2012/0019677 A1 | 1/2012 | Wong et al. |
| 2013/0070965 A1 | 3/2013 | Jang et al. |
| 2013/0335596 A1 | 12/2013 | Demandolx et al. |
| 2014/0198977 A1 | 7/2014 | Narasimha et al. |

(Continued)

FOREIGN PATENT DOCUMENTS

KR     20160060358 A     5/2016

OTHER PUBLICATIONS

PCT International Search Report, PCT Application No. PCT/US2017/048375, dated Dec. 7, 2017, 3 pages.

(Continued)

*Primary Examiner* — Jerome Grant, II
(74) *Attorney, Agent, or Firm* — International IP Law Group, P.L.L.C.

(57) ABSTRACT

A system for robust disparity estimation in the presence of significant intensity variations for camera arrays is described herein. The system comprises a camera array, a memory and a processor. The memory is configured to store imaging data. The processor is coupled to the memory and the camera array. When executing instructions, the processor is to obtain a plurality of images and generate a sequence of color matched images, wherein the sequence includes each pair of images in the plurality of images. The processor is also to calculate a plurality of disparity points based on the sequence of color matched images.

23 Claims, 5 Drawing Sheets

(56) References Cited

U.S. PATENT DOCUMENTS

| | | | |
|---|---|---|---|
| 2014/0270570 A1* | 9/2014 | Litvinov | H04N 5/3675 |
| | | | 382/275 |
| 2015/0161797 A1 | 6/2015 | Park et al. | |
| 2016/0150210 A1 | 5/2016 | Chang et al. | |
| 2016/0198138 A1 | 7/2016 | Wu et al. | |
| 2017/0061594 A1* | 3/2017 | Suzuki | G06T 5/009 |
| 2017/0171474 A1* | 6/2017 | Aota | H04N 5/2625 |
| 2017/0330501 A1* | 11/2017 | Kobayashi | G09G 3/2022 |
| 2017/0366747 A1* | 12/2017 | Wen | H04N 5/23232 |

OTHER PUBLICATIONS

Lee et al., "Multi-Array Camera Disparity Enhancement," IEEE Transactions on Multimedia, vol. 16, No. 8, Dec. 2014, 10 pages, USA.

Seshadrinathan et al., "High Dynamic Range Imaging Using Camera Arrays," Intel Labs, Intel Corporation, date viewed Dec. 20, 2016, 5 pages, Santa Clara, CA, USA.

* cited by examiner

302

300

400

ROBUST DISPARITY ESTIMATION IN THE PRESENCE OF SIGNIFICANT INTENSITY VARIATIONS FOR CAMERA ARRAYS

BACKGROUND ART

Camera arrays, which may be provided on computing devices such as tablets or smartphones for example, can capture multiple images of the same scene from different angles. These images can then be processed to generate a 3D space or depth map, and accurately locate objects form the scene and into the 3D space. Processing the captured images may require an accurate determination of correspondences between positions and/or pixels within the respective captured images. Based on such correspondences, depths may be estimated for objects and/or features associated with those positions and/or pixels. The accuracy with which such correspondences may be determined can depend on a homogenous color or lighting across the multiple images.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
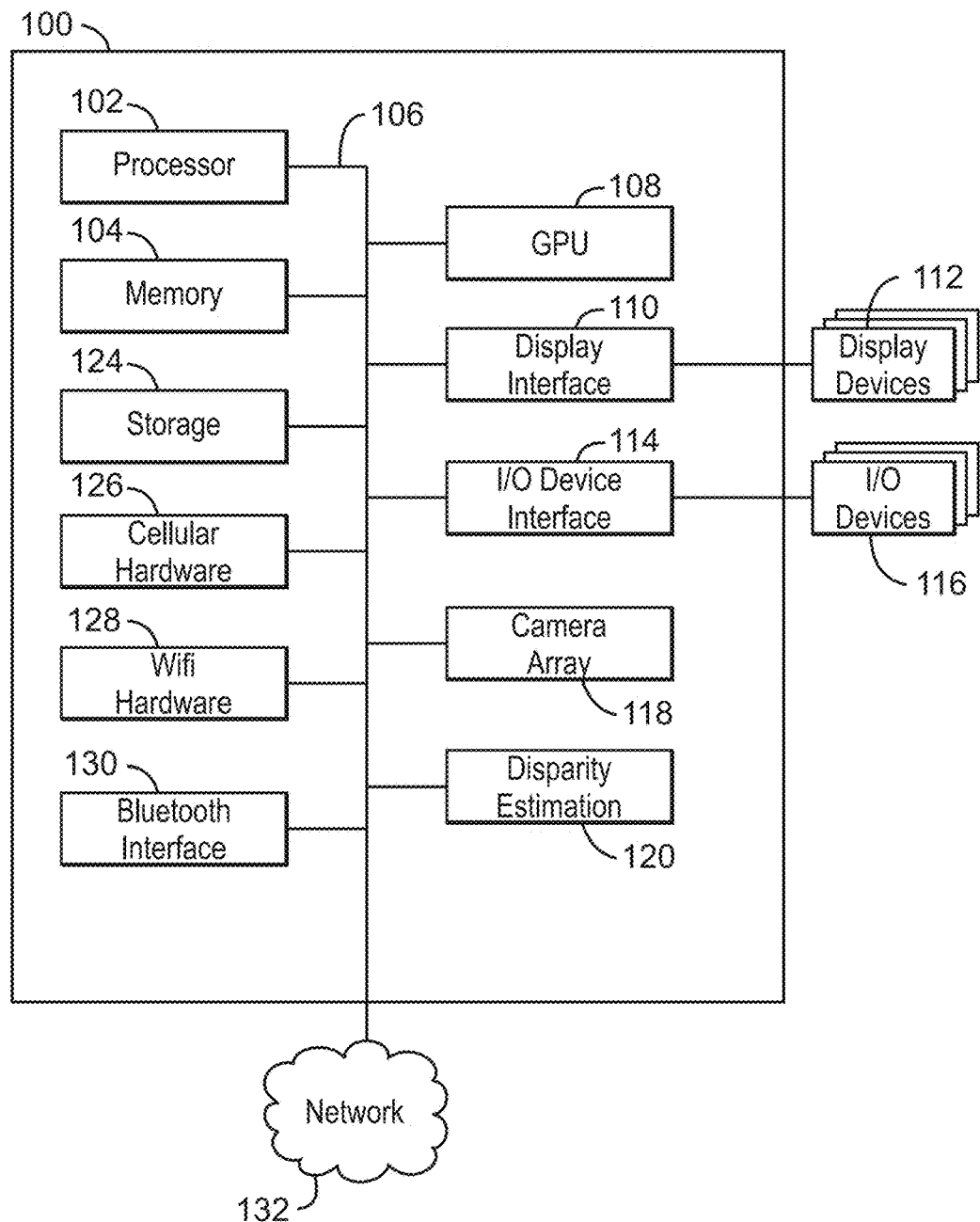
FIG. 1 is a block diagram of an electronic device that enables robust disparity estimation in the presence of significant intensity variations for camera arrays.

Processing a plurality of images from a camera array may include calculating pixel disparities for many different applications. In embodiments, a disparity is a measure of a difference in location of pixel or region from one image to another image. Thus, the disparity may be the difference between the corresponding points of left and right images in a pair of images from a camera array. The disparity may be used for applications such as three dimensional (3D) depth extraction, refocus, measurement, layer effect, view interpolation, and the like. The disparity values may be integer numbers that correspond to a number of pixels in a grid of pixels to relate a distance.

Disparity estimation is typically performed using multibaseline stereo (MBS) algorithms on data from camera arrays with one of the cameras assigned as the reference camera. These algorithms assume that features appear the same in the images across the camera array. These algorithms also estimate disparity for each pixel in the reference image by matching a patch surrounding a pixel against other remaining images from the camera array. However, features do not appear the same across camera images when intensity variations occur due to variable exposure assignment to individual cameras (for example, in HDR imaging) or due to heterogeneity of sensors in the array. While limited intensity variations can be overcome in disparity estimation using intensity matching to pre-process images or using error measures that are less sensitive to these variations, these techniques are not sufficient in the face of severe intensity variations and/or sensor saturation. In particular, saturated regions in the reference image pose a challenge to traditional MBS algorithms. In embodiments, a saturated region is a region or pixels of an image that has overly bright colors when compared to an average brightness of other pixels or regions of the image. In embodiments, saturation is the colorfulness of a color relative to its own brightness.

Embodiments described herein enable robust disparity estimation in the presence of significant intensity variations for camera arrays. Disparity may be robustly and accurately estimated in the presence of intensity variations across the images in a camera array. Sensor saturation may be modeled and camera pairs may be utilized that do not involve the reference camera to recover disparity even when the reference camera image is saturated. In embodiments, a significant intensity variation can be defined as a variation in color from pixel-to-pixel or region-to-region that is more than a threshold amount. In embodiments, the threshold amount may be a predetermined value that indicates a saturated portion of the image.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enables robust disparity estimation in the presence of significant intensity variations for camera arrays. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a camera array 118 for capturing a plurality of images. In embodiments, the camera array may be a plurality of image capture mechanisms, sensors, or any combination thereof. Accordingly, the sensor may be a depth sensor, an image sensor such as a charge-coupled device (CCD) image sensor, a complementary metal-oxide-semiconductor (CMOS) image sensor, a system on chip (SOC) image sensor, an image sensor with photosensitive thin film transistors, or any combination thereof. The camera array 118 may capture the plurality of images using an array of cameras that are to each capture a scene at the same point in time. The camera array 118 can include any number of cameras or sensors. In some embodiments, the images from the camera array 118 can be used to generate a composite image.

Generating a composite image may involve combining some or all of the captured images in the plurality of images. A disparity estimation unit 120 may be used to determine the correspondences between positions and/or pixels within the respective captured images. Based on such correspondences, depths may be estimated for objects and/or features associated with those positions and/or pixels. The accuracy with which such correspondences may be determined can depend on assumed homogeneity between image pairs. The disparity estimation unit may model sensor saturation. Each camera pair, even pairs that do not include a reference camera, may be utilized to recover disparity even when the reference camera image is saturated.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

In embodiments, intensity variations in captured images may occur due to varying exposures assigned to individual cameras for high dynamic range (HDR) imaging or may result from heterogeneity of the sensors in the camera array. Accurate disparity estimation in camera arrays is the first step in a number of applications that use camera arrays such as depth estimation, computational photography applications such as high dynamic range imaging, de-noising, high speed video etc.

Figure 2:
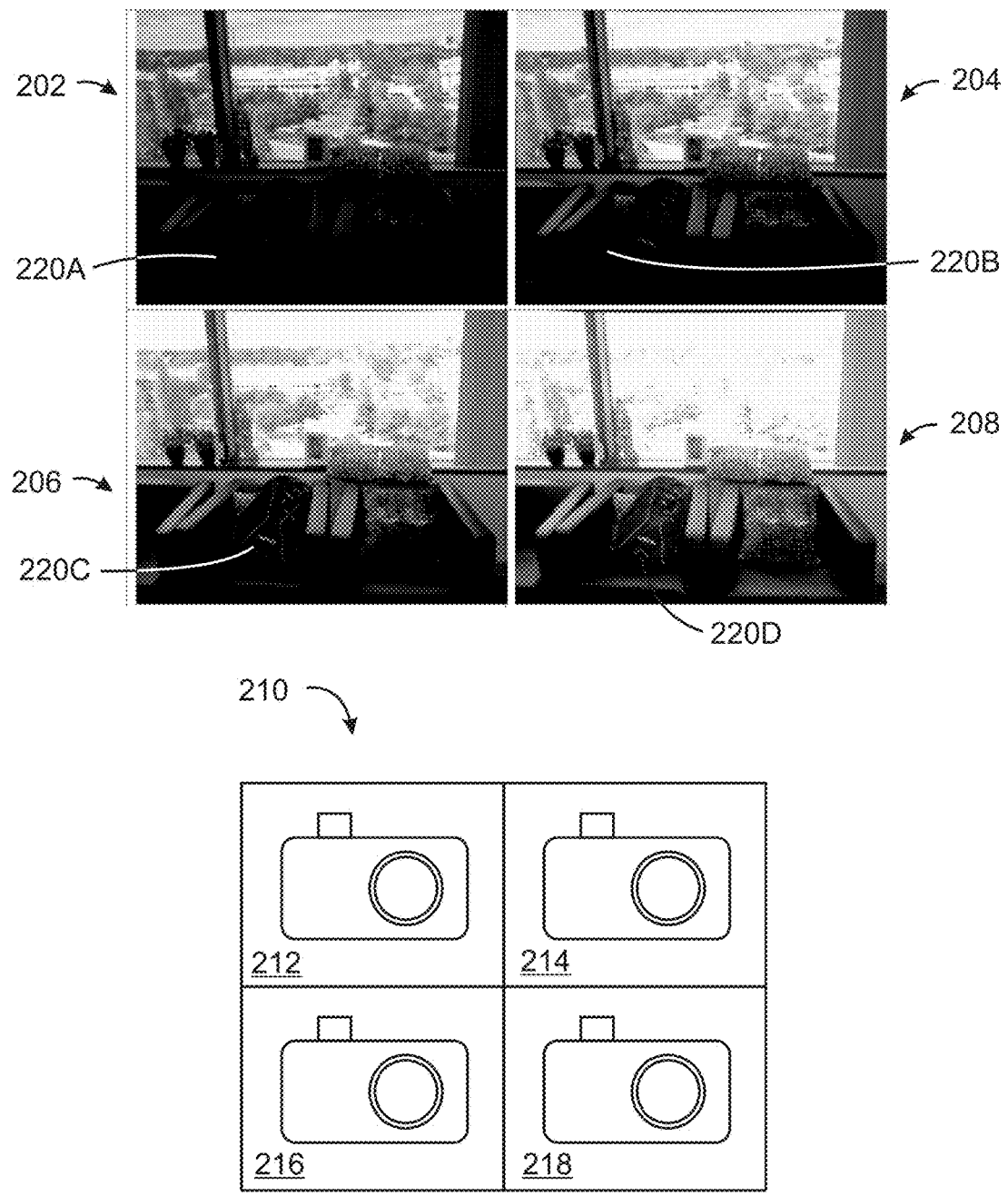
FIG. 2 is a plurality of images.

FIG. 2 is a plurality of images 200. The plurality of images 200 includes image 202, image 204, image 206, and image 208. The images may be captured by a camera array 210. The camera array 210 may include cameras 212, 214, 216, and 218. The camera 212 may capture image 202, the camera 214 may capture image 204, the camera 216 may capture image 206, and the camera 218 may capture image 208. In the example of HDR image capture, each of cameras 212, 214, 216, and 218 include varying exposure assignments. In embodiments, image exposure refers to the amount of light per unit area that reaches an image sensor.

In the example of FIG. 2, traditional MBS algorithms typically assign one of the cameras 212, 214, 216, and 218 as a reference camera, such as the camera 212. The disparity is estimated for each pixel in the corresponding reference image 202 by matching an image patch surrounding this pixel with every other image from the array. For example, a camera 212 that was used to capture image 202 may be a reference camera. An estimate of the disparity of pixel 220A in the image 202 may be found by matching the pixel 220A to an image patch 220B, 220C, and 220D respectively from every other image such as image 204, 206, and 208 from the array. As illustrated, the pixel 220 is located on a backpack 250 in each image. Setting different exposures results in varying appearance of image features across the camera array as shown in the plurality of images 202, 204, 206, and 208. Further, when the reference cameras suffers from saturation as shown in the image 202 in regions inside the room, the traditional MBS algorithm fails to estimate disparity accurately for these regions. However, disparity can be estimated accurately in these regions using the other camera images which have not saturated in these regions. Accordingly, image pairs that do not include the reference image 202, such as image 204/image 206, image 204/image 208, and image 206/image 208 can be used to estimate disparity. The present techniques utilize all camera pairs (and not just those involving the reference camera) and models saturation in an error function computed for disparity estimation to estimate disparity more accurately as shown in FIG. 3.

Figure 3:
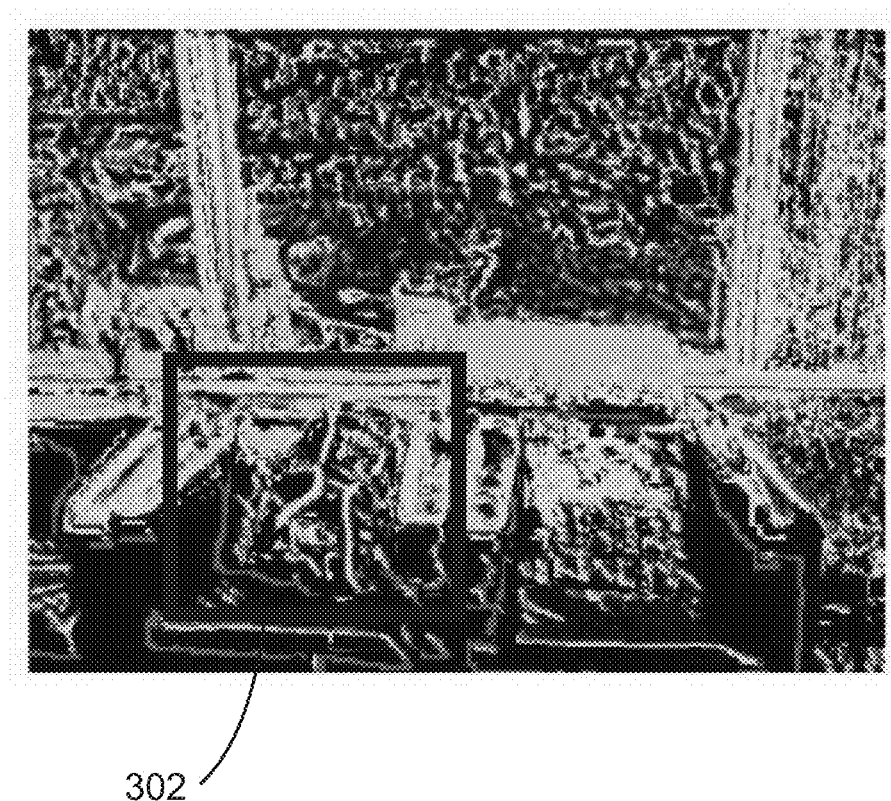
FIG. 3 is an illustration of a disparity map.

FIG. 3 is an illustration of a disparity map 300. The disparity map 300 may be generated using disparity estimation as described herein. The results of the present techniques on the same set of input images from a 2×2 camera array 200 (FIG. 2) are illustrated in FIG. 3. Improvements are visible in the region 302 that includes the backpack 250 from FIG. 2. Thus, disparity estimates can be found even when even when a reference image is oversaturated or without any visual information.

For example, consider a set of rectified images from a planar camera array and denote them using $\{I_k, k \leq N\}$, where $I_k$ represents the image from kth camera an N is the total number of cameras in an n×n array. The present techniques do not assume any knowledge of camera response curves or exposure values assigned to each camera. As a result, the present techniques can be used even when camera response curves and exposure values are unknown. In embodiments, it is assumed that that the geometry of the camera array is known. The baseline of camera k may be $\{B_k=[b_k^x, b_k^y], k \leq N\}$ and set $B_{ref}=0$ without any loss of generality for the reference camera. Here, x- and y-represent orthogonal axes in a 3D reference coordinate frame that are aligned with the columns and rows of the images respectively. In embodiments the baseline may include a horizontal baseline as the difference between the horizontal location of the reference image and that of the furthest row from the reference image, and a vertical baseline as the difference between the vertical location of the reference image and that of the furthest row from the reference image.

Let $B_{max}$ represent the longest baseline (horizontal or vertical) in the array and let $R_k$ represent the baseline ratio for camera k given by $$R_k^x = \frac{B_k^x}{B_{max}}$$

and a similar definition for $$R_k^y = \frac{B_k^y}{B_{max}}.$$

Traditional MBS algorithms attempt to minimize the following error function at a pixel x over a window w for a disparity range $d_i$, i=1, 2, . . . D:

$$d^*(x) = \mathrm{argmin}_{d_i} \Sigma_k \Sigma_{m \in w} |I_{ref}(x+m) - I_k(x+m+R_k d_i)| \quad \text{Eqn. (1)}$$

In the present techniques, a color matching algorithm is first used for camera arrays to generate a sequence of matched images denoted using $H_k$. An increased bit precision is used for the matched images to ensure that detail in the input images are preserved. In embodiments, the increased bit precision is floating point precision, and can be a double-precision floating point format or double-precision floating point format. The error function in Eqn. (1) may be modified to account for intensity variations across the input images as follows:

$$d*(x) = \mathrm{argmin}_{d_i} \sum_{j \neq k} \sum_{m \in w} w_{j,k}(x, m, d_i) |H_j(x+m+R_j d_i) - H_k(x+m+R_k d_i)| \quad \text{Eqn. (2)}$$

By incorporating all camera pairs into the error function, disparity can be estimated from the remaining cameras even if the reference camera is saturated. The weight $w_{j,k}(x, m, d_i)$ can be utilized to model saturation and in the simplest instance, the weights can be defined using a binary function to avoid saturated pixels in the error computation as follows:

$$w_{j,k}(x, m, d_i) = w_j(x, m, d_i) * w_k(x, m, d_i) \quad \text{Eqn. (3)}$$

-continued $$w_j(x, m, d_i) = \begin{cases} 1, & H_j(x, m, R_j d_i) > T_{min} \text{ and } H_j(x, m, R_j d_i) < T_{max} \\ 0, & \text{otherwise} \end{cases} \quad \text{Eqn. (4)}$$

Here, $T_{min}$ and $T_{max}$ represent thresholds beyond which the input image is saturated. Variable m indexes the pixels in a window W. Another weighting function in Eqn. (5) also attempts to account for the fact that as the baseline increases, occlusions cause problems with matching which can be ameliorated by weighting these error terms lower.

$$w_{j,k}(x, m, d_i) = w_j(x, m, d_i) * w_k(x, m, d_i) * \frac{B_{max}}{R_j - R_k} \quad \text{Eqn. (5)}$$

In embodiments, the error function may be computed using the sum of errors across all color channels in a color image. Saturation at each pixel can be modeled using a threshold criterion on just the grayscale value of that pixel. The present techniques can also be applied by utilizing different error functions other than the sum-of absolute differences shown above. For ease of description, the present techniques derive an error function using a census transform, which is a local binary pattern based approach, without any color matching of the input images. However, different error functions have different computational complexities and different trade-offs and the may be chosen depending on the application.

In embodiments, the present techniques may be implemented using an image pyramid such as a Gaussian pyramid. In a Gaussian pyramid, subsequent images are weighted down using a Gaussian average or Gaussian blur, and then scaled down. Each pixel contains a local average that corresponds to a pixel neighborhood on a lower level of the pyramid. The image pyramid which can provide computational savings for large disparity search ranges. Disparity computed at the coarsest scale of the image pyramid can be up-sampled and doubled in value for use as the midpoint of the search range at the next scale. In embodiments, each image from each camera is decomposed into a Gaussian pyramid separately. Disparity is then computed between every component of the Gaussian pyramid in one camera image against the corresponding component from the other camera images using the same technique.

Figure 4:
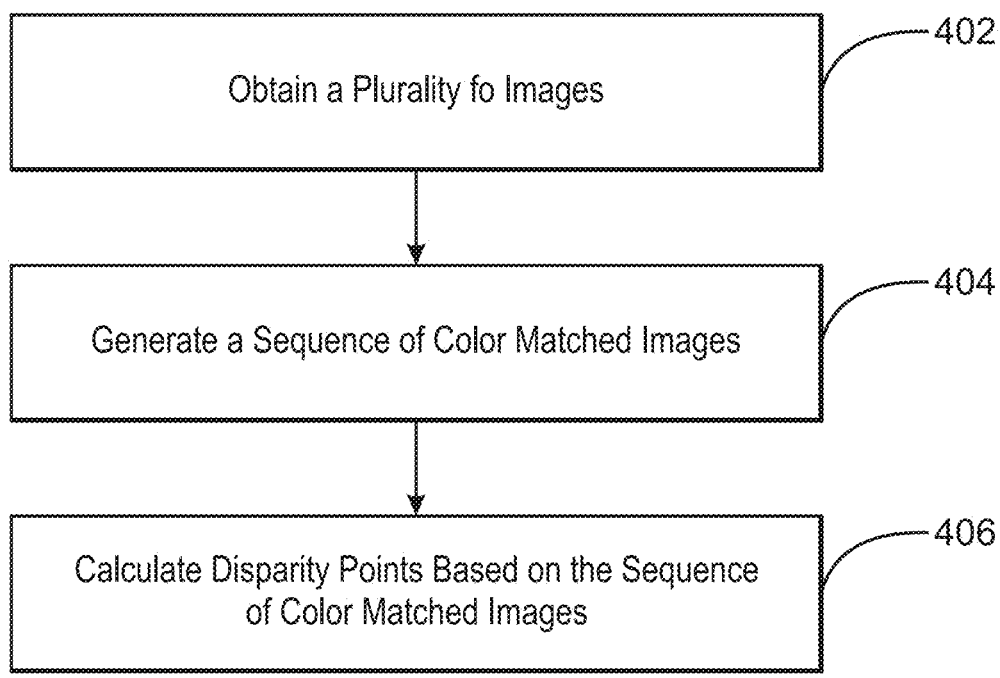
FIG. 4 is a process flow diagram of a method for disparity estimation.

FIG. 4 is a process flow diagram of a method 400 for disparity estimation. At block 402, a plurality of images is obtained. The plurality of images may include multiple images of the same scene as captured by a plurality of cameras in a camera array. The camera array may be in any position, such as planar, linear, and circular. At block 404, a sequence of color matched images is generated from the plurality of images. In embodiments, the color matching may include matching color based on features in an image histogram. Color matching may also be performed via matching pixel values across two input images with a thresholded mapping function slope. At block 406, a plurality of disparity points are calculated based on the sequence of color matched images. In embodiments, the plurality of disparity points is used to generate a disparity map. The plurality of disparity points may be calculated using an error function that is to determine a minimum at a correct matching disparity point between the sequence of color matched images. The error function may apply a weight to the sequence of color matched images to model saturation in each image, and the weight may use a binary function to avoid saturated pixels in the error function.

Figure 5:
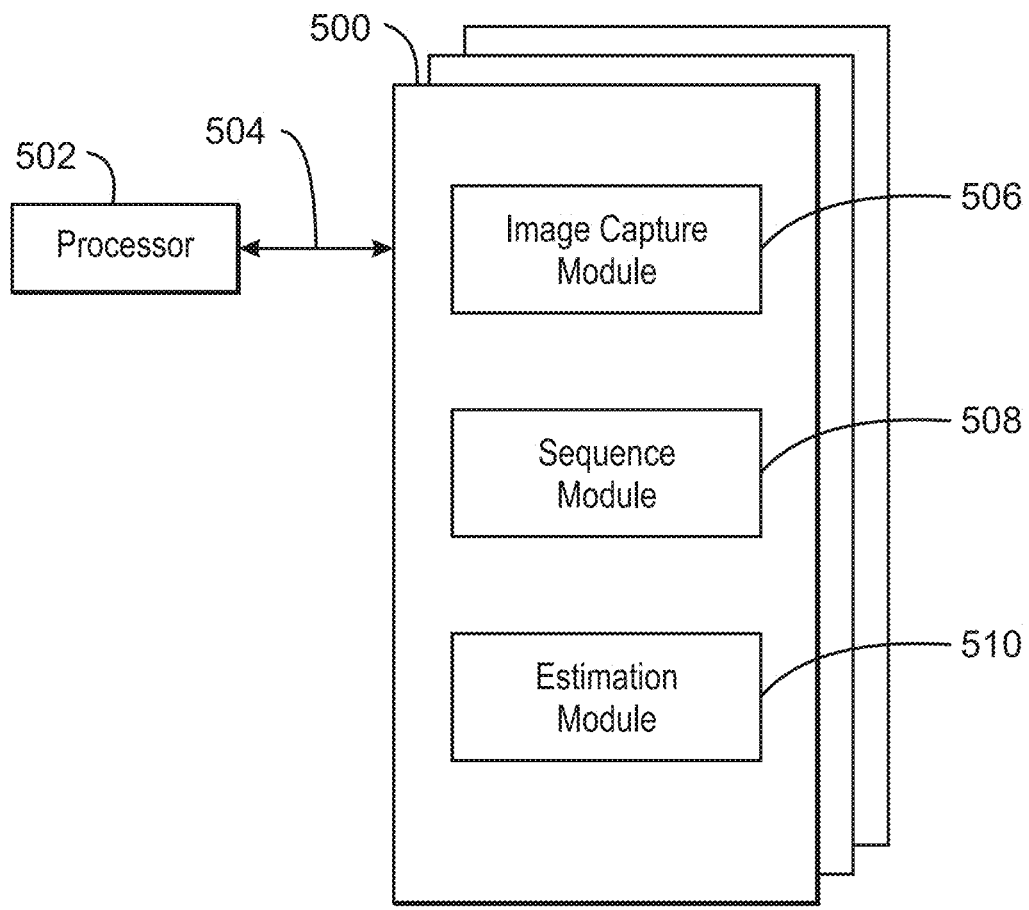
FIG. 5 is a block diagram showing media that contains logic for disparity estimation in the presence of significant intensity variations.

FIG. 5 is a block diagram showing media 500 that contains logic for disparity estimation in the presence of significant intensity variations. The media 500 may be a computer-readable medium, including a non-transitory medium that stores code that can be accessed by a processor 502 over a computer bus 504. For example, the computer-readable media 500 can be volatile or non-volatile data storage device. The media 500 can also be a logic unit, such as an Application Specific Integrated Circuit (ASIC), a Field Programmable Gate Array (FPGA), or an arrangement of logic gates implemented in one or more integrated circuits, for example.

The media 500 may include modules 506-510 configured to perform the techniques described herein. For example, an image capture module 506 may be configured to capture a plurality of images. A sequence module 508 may be configured to generate a sequence of color matched images. An estimation module 510 may be configured to estimate image disparity based on the sequence of color matched images. In some embodiments, the modules 506-510 may be modules of computer code configured to direct the operations of the processor 502.

The block diagram of FIG. 5 is not intended to indicate that the media 500 is to include all of the components shown in FIG. 5. Further, the media 500 may include any number of additional components not shown in FIG. 5, depending on the details of the specific implementation.

Example 1 is a system for robust disparity estimation in the presence of significant intensity variations for camera arrays. The system includes a camera array; a memory configured to store imaging data; and a processor coupled to the memory and the camera array, the processor to: obtain a plurality of images; generate a sequence of color matched images, wherein the sequence includes each pair of images in the plurality of images; calculate a plurality of disparity points based on the sequence of color matched images.

Example 2 includes the system of example 1, including or excluding optional features. In this example, the plurality of disparity points is calculated using an error function that is to determine a minimum at a correct matching disparity point between the sequence of color matched images. Optionally, the error function is to apply a weight to the sequence of color matched images to model saturation in each image. Optionally, the weight uses a function to avoid saturated pixels in the error function.

Example 3 includes the system of any one of examples 1 to 2, including or excluding optional features. In this example, the plurality of images includes multiple images of the same scene as captured by a plurality of cameras in a camera array.

Example 4 includes the system of any one of examples 1 to 3, including or excluding optional features. In this example, the sequence of color matched images is obtained from a color matching algorithm that uses image histograms.

Example 5 includes the system of any one of examples 1 to 4, including or excluding optional features. In this example, the plurality of disparity points is used to generate a disparity map.

Example 6 includes the system of any one of examples 1 to 5, including or excluding optional features. In this example, the plurality of disparity points is calculated using an error function with a lower weighting term in response to an increase in a baseline.

Example 7 includes the system of any one of examples 1 to 6, including or excluding optional features. In this example, the plurality of disparity points is calculated using an error function on an output of a Gaussian pyramid.

Example 8 includes the system of any one of examples 1 to 7, including or excluding optional features. In this example, sensors of the camera array are heterogeneous.

Example 9 includes the system of any one of examples 1 to 8, including or excluding optional features. In this example, the camera array is a planar, linear, or circular array.

Example 10 is a method for robust disparity estimation in the presence of significant intensity variations for camera arrays. The method includes obtaining a plurality of images from a camera array; generating a sequence of color matched images, wherein the sequence includes each pair of images in the plurality of images; and estimating disparity at a pixel in one reference image of the plurality of images via an error function applied to the sequence of color matched image pairs.

Example 11 includes the method of example 10, including or excluding optional features. In this example, the error function is to determine a minimum at a correct matching disparity point between the sequence of color matched images.

Example 12 includes the method of any one of examples 10 to 11, including or excluding optional features. In this example, the disparity is estimated from the remaining cameras even if a reference camera is saturated.

Example 13 includes the method of any one of examples 10 to 12, including or excluding optional features. In this example, the error function is to apply a weight to the sequence of color matched images to model saturation in each image. Optionally, the weight uses a function to avoid saturated pixels in the error function.

Example 14 includes the method of any one of examples 10 to 13, including or excluding optional features. In this example, the plurality of images includes multiple images of the same scene as captured by a plurality of cameras in a camera array.

Example 15 includes the method of any one of examples 10 to 14, including or excluding optional features. In this example, the sequence of color matched images is obtained from a color matching algorithm that uses image histograms.

Example 16 includes the method of any one of examples 10 to 15, including or excluding optional features. In this example, the estimate of disparity is used to generate a disparity map.

Example 17 includes the method of any one of examples 10 to 16, including or excluding optional features. In this example, the estimate of disparity is calculated using an error function with a lower weighting term in response to an increase in a baseline.

Example 18 includes the method of any one of examples 10 to 17, including or excluding optional features. In this example, the estimate of disparity points is calculated using an error function on an output of a Gaussian pyramid.

Example 19 is an apparatus for robust disparity estimation in the presence of significant intensity variations for camera arrays. The apparatus includes a camera array to obtain a plurality of images; a controller to generate a sequence of color matched images, wherein the sequence includes each pair of images in the plurality of images; a disparity unit to calculate a plurality of disparity points based on the sequence of color matched images.

Example 20 includes the apparatus of example 19, including or excluding optional features. In this example, the error function is to determine a minimum at a correct matching disparity point between the sequence of color matched images.

Example 21 includes the apparatus of any one of examples 19 to 20, including or excluding optional features. In this example, the disparity is estimated from the remaining cameras even if a reference camera is saturated.

Example 22 includes the apparatus of any one of examples 19 to 21, including or excluding optional features. In this example, the error function is to apply a weight to the sequence of color matched images to model saturation in each image. Optionally, the weight uses a function to avoid saturated pixels in the error function.

Example 23 includes the apparatus of any one of examples 19 to 22, including or excluding optional features. In this example, the plurality of images includes multiple images of the same scene as captured by a plurality of cameras in a camera array.

Example 24 includes the apparatus of any one of examples 19 to 23, including or excluding optional features. In this example, the sequence of color matched images is obtained from a color matching algorithm that uses image histograms.

Example 25 includes the apparatus of any one of examples 19 to 24, including or excluding optional features. In this example, the estimate of disparity is used to generate a disparity map.

Example 26 includes the apparatus of any one of examples 19 to 25, including or excluding optional features. In this example, the estimate of disparity is calculated using an error function with a lower weighting term in response to an increase in a baseline.

Example 27 includes the apparatus of any one of examples 19 to 26, including or excluding optional features. In this example, the estimate of disparity points is calculated using an error function on an output of a Gaussian pyramid.

Example 28 is at least one machine readable medium comprising a plurality of instructions that. The computer-readable medium includes instructions that direct the processor to obtain a plurality of images from a camera array; generate a sequence of color matched images, wherein the sequence includes each pair of images in the plurality of images; estimate disparity at a pixel in one reference image of the plurality of images via an error function applied to the sequence of color matched image pairs.

Example 29 includes the computer-readable medium of example 28, including or excluding optional features. In this example, the error function is to determine a minimum at a correct matching disparity point between the sequence of color matched images.

Example 30 includes the computer-readable medium of any one of examples 28 to 29, including or excluding optional features. In this example, the disparity is estimated from the remaining cameras even if a reference camera is saturated.

Example 31 includes the computer-readable medium of any one of examples 28 to 30, including or excluding optional features. In this example, the error function is to apply a weight to the sequence of color matched images to model saturation in each image. Optionally, the weight uses a function to avoid saturated pixels in the error function.

Example 32 includes the computer-readable medium of any one of examples 28 to 31, including or excluding optional features. In this example, the plurality of images includes multiple images of the same scene as captured by a plurality of cameras in a camera array.

Example 33 includes the computer-readable medium of any one of examples 28 to 32, including or excluding optional features. In this example, the sequence of color matched images is obtained from a color matching algorithm that uses image histograms.

Example 34 includes the computer-readable medium of any one of examples 28 to 33, including or excluding optional features. In this example, the estimate of disparity is used to generate a disparity map.

Example 35 includes the computer-readable medium of any one of examples 28 to 34, including or excluding optional features. In this example, the estimate of disparity is calculated using an error function with a lower weighting term in response to an increase in a baseline.

Example 36 includes the computer-readable medium of any one of examples 28 to 35, including or excluding optional features. In this example, the estimate of disparity points is calculated using an error function on an output of a Gaussian pyramid.

Example 37 is an apparatus for robust disparity estimation in the presence of significant intensity variations for camera arrays. The apparatus includes instructions that direct the processor to a camera array to obtain a plurality of images; a controller to generate a sequence of color matched images, wherein the sequence includes each pair of images in the plurality of images; a means to estimate a plurality of disparity points based on the sequence of color matched images.

Example 38 includes the apparatus of example 37, including or excluding optional features. In this example, the error function is to determine a minimum at a correct matching disparity point between the sequence of color matched images.

Example 39 includes the apparatus of any one of examples 37 to 38, including or excluding optional features. In this example, the disparity is estimated from the remaining cameras even if a reference camera is saturated.

Example 40 includes the apparatus of any one of examples 37 to 39, including or excluding optional features. In this example, the error function is to apply a weight to the sequence of color matched images to model saturation in each image. Optionally, the weight uses a function to avoid saturated pixels in the error function.

Example 41 includes the apparatus of any one of examples 37 to 40, including or excluding optional features. In this example, the plurality of images includes multiple images of the same scene as captured by a plurality of cameras in a camera array.

Example 42 includes the apparatus of any one of examples 37 to 41, including or excluding optional features. In this example, the sequence of color matched images is obtained from a color matching algorithm that uses image histograms.

Example 43 includes the apparatus of any one of examples 37 to 42, including or excluding optional features. In this example, the estimate of disparity is used to generate a disparity map.

Example 44 includes the apparatus of any one of examples 37 to 43, including or excluding optional features. In this example, the means to estimate a plurality of disparity points calculate the disparity points using an error function with a lower weighting term in response to an increase in a baseline.

Example 45 includes the apparatus of any one of examples 37 to 44, including or excluding optional features. In this example, the estimate of disparity points is calculated using an error function on an output of a Gaussian pyramid.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for robust disparity estimation in the presence of significant intensity variations for camera arrays, comprising:
a camera array;
a memory configured to store imaging data; and
a processor coupled to the memory and the camera array, the processor to:
obtain a plurality of images from the camera array;
generate a sequence of color matched images, wherein the sequence includes each pair of images in the plurality of images and are generated via a color matching algorithm based on features in an image histogram;
calculate a disparity point for a pixel of the plurality of images based on the sequence of color matched images, wherein the disparity point is a measure of a difference in location between the pixel in a first image and the pixel in a second image in the sequence of color matched image pairs, and the disparity is estimated from a remaining camera in response to pixels of a reference camera being saturated.

2. The system of claim 1, wherein the disparity point is calculated using an error function that is to determine a minimum of the error function at the pixel of the sequence of color matched images, and the error function is to apply a weight to the sequence of color matched images to model saturation in each image, wherein the weight uses a binary function to avoid saturated pixels in the error function.

3. The system of claim 1, wherein the plurality of images includes multiple images of the same scene as captured by a plurality of cameras in a camera array.

4. The system of claim 1, wherein the disparity point is used to generate a disparity map.

5. The system of claim 1, wherein the disparity point is calculated using an error function with a lower weighting term in response to an increase in a baseline.

6. The system of claim 1, wherein the disparity point is calculated using an error function on an output of a Gaussian pyramid.

7. The system of claim 1, wherein sensors of the camera array are heterogeneous.

8. The system of claim 1, wherein the camera array is a planar, linear, or circular array.

9. A method for robust disparity estimation in the presence of significant intensity variations for camera arrays, comprising:

obtaining a plurality of images from a camera array;

generating a sequence of color matched images, wherein the sequence includes each pair of images in the plurality of images; and estimating disparity at a pixel in a first image of the plurality of images via an error function applied to the sequence of color matched image pairs, wherein disparity is a difference in location between the pixel in the first image and the pixel in a second image in the sequence of color matched image pairs and the disparity is estimated from a remaining camera in response to pixels of a reference camera being saturated.

10. The method of claim 9, wherein the error function is to determine a minimum of the error function at the pixel of the sequence of color matched images.

11. The method of claim 9, wherein the error function is to apply a weight to the sequence of color matched images to model saturation in each image, and the weight uses a function to avoid saturated pixels in the error function.

12. The method of claim 9, wherein the plurality of images includes multiple images of the same scene as captured by a plurality of cameras in a camera array.

13. The method of claim 9, wherein the sequence of color matched images is obtained from a color matching algorithm that uses image histograms.

14. The method of claim 9, wherein the estimate of disparity is used to generate a disparity map.

15. An apparatus for robust disparity estimation in the presence of significant intensity variations for camera arrays, comprising:

a camera array to obtain a plurality of images;

a controller to generate a sequence of color matched images, wherein the sequence includes each pair of images in the plurality of images; and a disparity unit to calculate a disparity point for a pixel of the plurality of images based on the sequence of color matched images, wherein the disparity point is calculated from a remaining camera in response to pixels of a reference camera being saturated.

16. The apparatus of claim 15, wherein the error function is to determine a minimum of the error function at the pixel of the sequence of color matched images.

17. The apparatus of claim 15, wherein the disparity is estimated from the remaining cameras in response to pixels of a reference camera being saturated.

18. The apparatus of claim 15, wherein the error function is to apply a weight to the sequence of color matched images to model saturation in each image.

19. At least non-transitory one machine readable medium comprising a plurality of instructions that, in response to being executed on a computing device, cause the computing device to:

obtain a plurality of images from a camera array;

generate a sequence of color matched images, wherein the sequence includes each pair of images in the plurality of images; and estimate disparity at a pixel in a first image of the plurality of images via an error function applied to the sequence of color matched image pairs, wherein disparity is a difference in location between the pixel in the first image and the pixel in a second image in the sequence of color matched image pairs and the disparity is estimated from a remaining camera in response to pixels of a reference camera being saturated.

20. The non-transitory computer readable medium of claim 19, wherein the sequence of color matched images is obtained from a color matching algorithm that uses image histograms.

21. The non-transitory computer readable medium of claim 19, wherein the estimate of disparity is used to generate a disparity map.

22. The non-transitory computer readable medium of claim 19, wherein the estimate of disparity is calculated using an error function with a lower weighting term in response to an increase in a baseline.

23. The non-transitory computer readable medium of claim 19, wherein the estimate of disparity is calculated using an error function on an output of a Gaussian pyramid.

\* \* \* \* \*